United States Patent
Hayashi et al.

(10) Patent No.: US 11,484,963 B2
(45) Date of Patent: Nov. 1, 2022

(54) FITTING MEMBER, ANNULAR MEMBER, JOINED MEMBER AND METHOD OF MANUFACTURING JOINED MEMBER

(71) Applicants: ORIGIN COMPANY, LIMITED, Saitama (JP); SUBARU CORPORATION, Tokyo (JP)

(72) Inventors: Toshihiko Hayashi, Saitama (JP); Motofumi Suzuki, Tokyo (JP)

(73) Assignees: ORIGIN COMPANY, LIMITED, Saitama (JP); SUBARU CORPORATION, Tokyo (JP)

( * ) Notice: Subject to any disclaimer, the term of this patent is extended or adjusted under 35 U.S.C. 154(b) by 270 days.

(21) Appl. No.: 16/355,384

(22) Filed: Mar. 15, 2019

(65) Prior Publication Data
US 2019/0291166 A1   Sep. 26, 2019

(30) Foreign Application Priority Data
Mar. 23, 2018 (JP) .............................. JP2018-056159

(51) Int. Cl.
*B23K 11/02* (2006.01)
*F16B 4/00* (2006.01)
(Continued)

(52) U.S. Cl.
CPC .............. *B23K 11/02* (2013.01); *B23K 20/02* (2013.01); *B23K 20/028* (2013.01); *B23K 33/00* (2013.01);
(Continued)

(58) Field of Classification Search
CPC .... B23K 11/02; B23K 20/028; B23K 33/006; B23K 20/02; B23K 33/00; B23P 11/02; F16B 4/004; F16B 9/09; Y10T 29/49945
See application file for complete search history.

(56) References Cited

U.S. PATENT DOCUMENTS

| 2002/0014514 | A1* | 2/2002 | Shimizu | ................. F16L 13/00 228/104 |
| 2002/0148879 | A1* | 10/2002 | Ezumi | ................. B23K 20/122 228/112.1 |

(Continued)

FOREIGN PATENT DOCUMENTS

| CN | 101655322 A | 2/2010 |
| EP | 1231011 A2 | 8/2002 |

(Continued)

OTHER PUBLICATIONS

JP2011245512 Translation (Year: 2011).*

(Continued)

*Primary Examiner* — Matthew P Travers
(74) *Attorney, Agent, or Firm* — Squire Patton Boggs (US) LLP

(57) ABSTRACT

To provide a fitting member, an annular member, a joined member and a method of manufacturing the joined member, which prevent occurrence of a not-joined portion. A fitting member 10 has a fitting protrusion 10p which is protruded outward on an outside face 10s. An annular member 20 contains a space 20h in which the fitting member 10 is to be fitted. An annular member 20 has an annular protrusion 20p on an inside face 20f. When the fitting member 10 is fitted into the space 20h at a predetermined depth, the fitting (Continued)

protrusion 10p and the annular protrusion 20p fill not-joined portions which may be generated assuming that they are not provided. A joined member 30 is produced by fitting the fitting member 10 into the space 20h at the predetermined depth, so that a contact portion between the fitting member 10 and the annular member 20 is joined in solid phase.

5 Claims, 5 Drawing Sheets

(51) Int. Cl.
  *B23P 11/02* (2006.01)
  *B23K 20/02* (2006.01)
  *B23K 33/00* (2006.01)
  *F16B 9/00* (2006.01)

(52) U.S. Cl.
  CPC .............. *B23P 11/02* (2013.01); *F16B 4/004* (2013.01); *F16B 9/09* (2018.08)

(56) References Cited

U.S. PATENT DOCUMENTS

| | | | | |
|---|---|---|---|---|
| 2004/0232207 A1* | 11/2004 | Alford | ................... | B23K 13/01 228/105 |
| 2016/0236301 A1* | 8/2016 | Frey | ....................... | B23K 33/00 |
| 2017/0266763 A1* | 9/2017 | Kadoya | .................. | B23K 11/02 |
| 2019/0247909 A1* | 8/2019 | Yamamoto | ............. | B23K 11/36 |

FOREIGN PATENT DOCUMENTS

| | | |
|---|---|---|
| JP | 2004017048 A | 1/2004 |
| JP | 2006/263809 A | 10/2006 |
| JP | 2011-094747 A | 5/2011 |
| JP | 2011/098358 A | 5/2011 |
| JP | 2011/245512 A | 12/2011 |
| JP | 2016-209926 A | 12/2016 |
| JP | 6109395 | 4/2017 |

OTHER PUBLICATIONS

JP2006263809 Translation (Year: 2006).*
First Office Action dated Mar. 2, 2021 issued Chinese Patent Application No. 201980019891.6, with English translation, 12 pages.
International Search Report dated Jun. 18, 2019 for PCT Application No. PCT/JP2019/011669, 2 pages.
Notice of Reasons of Refusal dated Sep. 17, 2019 for Japanese Application No. 2018-056159, with English translation, 11 pages.
Communication forwarding the extended European Search Report for European Patent Application No. 19771465.2 dated Nov. 26, 2021, 10 pages.

* cited by examiner

FITTING MEMBER, ANNULAR MEMBER, JOINED MEMBER AND METHOD OF MANUFACTURING JOINED MEMBER

TECHNICAL FIELD

The present invention relates to a fitting member, an annular member, a joined member and a method of manufacturing the joined member, more particularly, to a fitting member and an annular member that are joined without occurrence of a not-joined portion, a joined member produced by joining the fitting member with the annular member, and a method of manufacturing the joined member.

BACKGROUND ART

As a method of manufacturing a component in which a rod-like member such as a shaft is fitted into a central hollow space of an annular (ring-like) member such as a drum, for example, an automotive clutch member, Ring Mash (trademark registered in Japan) joining is an available joining method in which the annular metal member and the rod-like metal member are overlapped slightly and supplied with a current under a pressure so that those member are softened by Joule heat and joined together (see Patent Document 1, for example). FIG. 5A shows an outline of the joining method, illustrating a state in which a rod-like member 110 fitted into a central space 120h of an annular member 120 is sandwiched between an upper electrode Et and a lower electrode Es and supplied with a current under an increased pressure. When joining of the rod-like member 110 and the annular member 120 is achieved, softened portion is pushed out so that, as shown in FIG. 5B, burr B is produced.

PRIOR ART DOCUMENT

Patent Document

Patent Document 1: JP 2004-17048 A

DISCLOSURE OF INVENTION

Problem to be Solved by the Invention

The Ring Mash (trademark registered in Japan) is a press-fitting type joining method and has an advantage that deep joining can be performed in an axial direction and obtaining coaxial accuracy can be easily achieved as compared to, for example, ring projection joining. However, as the press-fitting depth increases, a not-joined portion G may be, as shown in FIG. 5B, produced between one of the members and the other member which has not produced a burr B on both ends in the axial direction, which is unfavorable phenomenon for the joined member.

In views of the above-described problem, an object of the present invention is to provide a fitting member and an annular member that can be joined without occurrence of a not-joined portion, a joined member produced by joining these members and a manufacturing method therefor.

Means for Solving the Problem

To achieve the above object, a fitting member according to the first aspect of the present invention is, as shown in FIG. 1A, for example, of metallic material to be fitted into an inside space 20h of an annular member 20 of metallic material. The annular member 20 is formed in an annular shape and having a predetermined thickness 20t. A contour 10D of an outside face 10s of the fitting member 10 may be formed slightly larger than a contour 20D of the space 20h in a section in an orthogonal direction H. The orthogonal direction H may be a direction perpendicular to a thickness direction V. The thickness direction V ma be a direction of the thickness 20t of the annular member 20. An axis of the fitting member 10 may be extended in the thickness direction V when the fitting member 10 is fitted into the space 20h. The space 20h may be of a portion into which the fitting member 10 is to be fitted. The fitting member 10 is configured to be provided with a fitting protrusion 10p on the outside face 10s. The fitting protrusion 10p extends outward of the outside face 10s and the fitting protrusion 10p is for being applied into a surface not-joined portion Gt (see FIG. 5B, for example) when the fitting member 10 is fitted into the space 20h at a predetermined depth. The surface not-joined portion Gt is a gap between the fitting member 10 and the annular member 20 and is produced in the vicinity of a surface 20r of the annular member 20 on a side in which the fitting member 10 is inserted by fitting the fitting member 10 into the space 20h, when assuming that there is no fitting protrusion 10p.

With such a configuration, when the fitting member is fitted into the annular member, the fitting protrusion prevents the occurrence of a not-joined portion.

To achieve the above object, an annular member according to the second aspect of the present invention is, as shown in FIG. 1A, for example, of metallic material, formed in an annular shape and having a predetermined thickness 20t. A space 20h in which a fitting member 10 of metallic material is to be fitted is formed inside the annular shape of the annular member 20. A contour 20hD of the space 20h may be formed slightly smaller than a contour 10D of an outside face 10s of the fitting member 10 in a section in an orthogonal direction H. The orthogonal direction H may be a direction perpendicular to a thickness direction V. The thickness direction V may be a direction of the thickness 20t of the annular member 20. An axis of the fitting member 10 may be extended in the thickness direction V when the fitting member 10 is fitted into the space 20h. The annular member 20 is configured to be provided with an annular protrusion 20p on an inside face 20f. The inside face 20f is a border of the annular member 20 on the space 20h. The annular protrusion 20p extends toward the space 20h from the inside face 20f and the annular protrusion 20p is for being applied into an end not-joined portion Gs (see FIG. 5B, for example). The end not-joined portion Gs is a gap between the fitting member 10 and the annular member 20 and is produced in the vicinity of an end portion 10e of the outside face 10s of the fitting member 10 existing in the space 20h by fitting the fitting member 10 into the space 20h, when assuming that there is no annular protrusion 20p.

With such a configuration, when the fitting member is fitted into the annular member, the annular protrusion prevents the occurrence of a not-joined portion.

As for the annular member according to the third aspect of the present invention, as shown in FIG. 4A, for example, in the annular member according to the second aspect, the annular member 20A has an end portion receiver 20s for receiving the end portion 10e when the fitting member 10 is fitted into the space 20h at a predetermined depth, and the end portion receiver 20s is formed to produce a pocket 20v between the end portion receiver 20s and the end portion 10e when the fitting member 10 is fitted into the space 20h at the predetermined depth.

With such a configuration, burr generated in joining the fitting member with the annular member can be accommodated in the pocket.

As for a joined member according to the fourth aspect of the present invention, as shown in FIG. 1B, for example, the joined member includes the fitting member 10 according to the first aspect; and the annular member 20 according to the second aspect or third aspect; wherein a contact portion between the fitting member 10 and the annular member 20 is joined in solid phase when the fitting member 10 is fitted into the space 20h (see FIG. 1A, for example) at the predetermined depth.

With such a configuration, the occurrence of a not-joined portion can be prevented in the joined member.

As for a method for manufacturing a joined member according to the fifth aspect of the present invention, as shown in FIGS. 1A and 3, for example, the method includes a step (S2) of providing the fitting member 10 according to the first aspect; a step (S1) of providing the annular member 20 according to the second aspect or third aspect; a pressurization step (S3 to S6) of pressurizing the fitting member 10 and the annular member 20 until the fitting member 10 is fitted into the space 20h at the predetermined depth; and a current supplying step (S4) of supplying a current to a contact portion between the fitting member 10 and the annular member 20 during the pressurization step (S3 to S6); wherein the contact portion between the fitting member 10 and the annular member 20 is joined in solid phase in the pressurization step (S3 to S6) and the current supplying step (S4) so as to produce the joined member 30 (see FIGS. 1B and 1C, for example) in which the fitting member 10 and the annular member 20 are joined together.

With such a configuration, the joined member in which a not-joined portion is prevented from occurring can be produced.

Advantage of the Invention

According to the present invention, when the fitting member and the annular member are joined together, the occurrence of a not-joined portion can be prevented.

BEST MODE FOR CARRYING OUT THE INVENTION

Figure 1A:
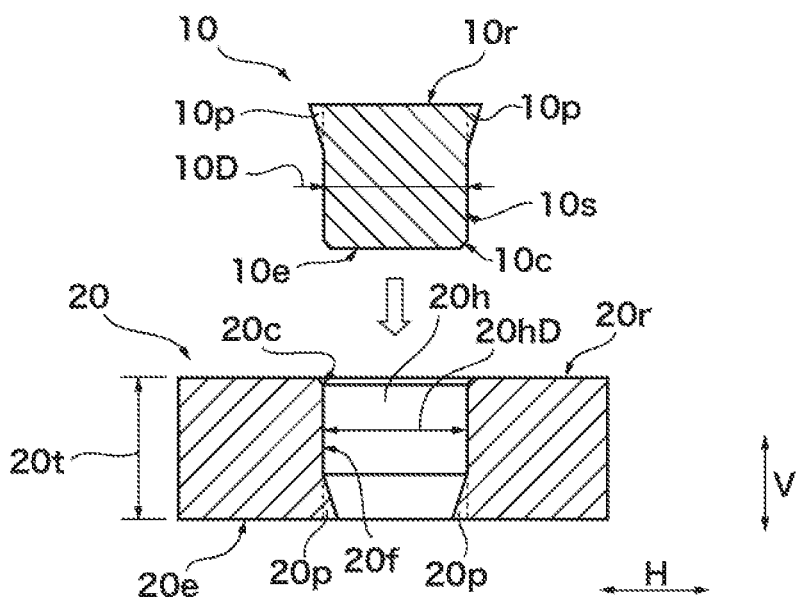
FIG. 1A is a sectional view, illustrating a fitting member and an annular member that are in a state before both members are fitted together according to the present invention.

This application is based on the Patent Application No. 2018-056159 filed on Mar. 23, 2018 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Hereinafter, an embodiment of the present invention will be described with reference to the drawings. In the meantime, the same or equivalent component in each drawing is provided with the same or similar reference numeral, and a duplicate description is not repeated.

Figure 1B:
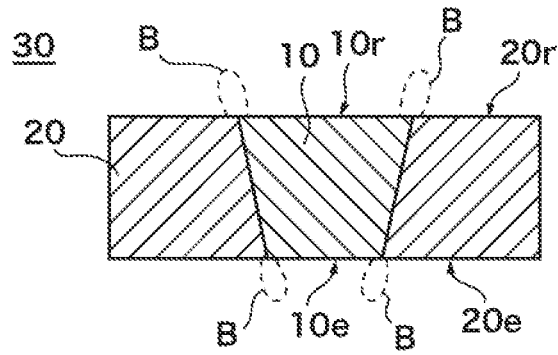
FIG. 1B is a sectional view, illustrating a joined member formed by fitting the fitting member to the annular member according to the present invention.
Figure 1C:
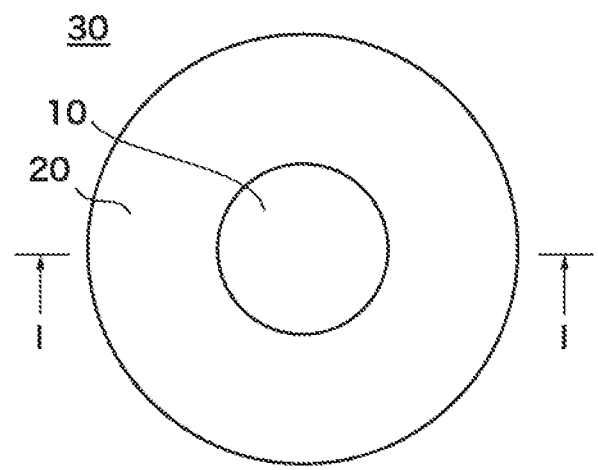
FIG. 1C is a plan view, illustrating the joined member according to the present invention.

First, with reference to FIGS. 1A to 1C, there will be an explanation about a fitting member 10, an annular member 20 and a joined member 30, each of which represents an embodiment of the present invention. FIG. 1A is a sectional view, illustrating a fitting member 10 and an annular member 20 that are in a state before both members are fitted together, FIG. 1B is a sectional view, illustrating a joined member 30 formed by fitting the fitting member 10 to the annular member 20, and FIG. 1C is a plan view, illustrating the joined member 30. Each section in FIGS. 1A and 1B is the section along the line I-I of FIG. 1C. The fitting member 10 can be used as a shaft of an automotive clutch component, for example. The annular member 20 can be used as a drum of the automotive clutch component, for example. In the following description, a direction of thickness 20t of the annular member 20 (hereinafter referred to as "annular member thickness 20t") is referred to as thickness direction V and a direction perpendicular to the thickness direction V is referred to as orthogonal direction H. The thickness direction V and orthogonal direction H are used for the fitting member 10 also when the fitting member 10 is placed in a direction of fitting the fitting member 10 into the annular member 20.

The fitting member 10 is a member formed by processing a metallic material, for example, carbon steel, alloy steel, cast iron or the like. However, other metals may be used and a preferable material can be used depending on a purpose. In the present embodiment, the fitting member 10 is formed as a basic shape in a solid round bar. When viewing the solid round bar as a cylinder, assume that a portion corresponding to its side face is an outside face 10s and one face of both ends is end face 10e while the other face is top face 10r. The basic shape means generally a shape mentioned here although strictly speaking, a different part can appear. Further, an outside diameter of the outside face 10s in the basic shape is referred to as fitting diameter 10D. In the present embodiment, when fitting the fitting member 10 into the annular member 20, assume that the end face 10e (end portion) side is fitted first. A fitting C face (chamfered face) 10c is formed on the fitting member 10 by chamfering an entire border between the outside face 10s and the end face 10e. The fitting C face 10c may be, in a range of, for example, 0.3 to 0.6 or may be 0.5 (mm). The fitting member 10 is provided with a fitting protrusion 10p formed on the outside face 10s of the top face 10r side. The fitting protrusion 10p is provided on an entire periphery of the outside face 10s. The fitting protrusion 10p is inclined with respect to the outside face 10s so that the diameter of a section in the orthogonal direction H increases as it goes from the end face 10e side toward the top face 10r.

The annular member 20 is a member formed by processing a metallic material and may be formed of the same kind of material as the fitting member 10 or may be formed of a different metallic material from the fitting member 10. A preferable material may be used depending on a purpose. In the present embodiment, the annular member 20 is formed into such a donut shape that a cylindrical hole is bored in the center of a circular thick plate as a basic shape, having a predetermined thickness as the annular member thickness 20t. The predetermined thickness of the annular member thickness 20t is a thickness required for the joined member 30 as a product. The cylindrical hole as the basic shape is an inside space 20h in which the fitting member 10 is to be fitted. A face of the annular member 20 produced on a border between the annular member 20 and the inside space 20h is referred to as an inside face 20f. Further, in the annular member 20, a circular thick plate's face from which the fitting member 10 is inserted is referred to as an upper face 20r and an opposite face to the upper face 20r is referred to as a lower face 20e. The upper face 20r corresponds to a surface of the annular member 20 on a side from which the fitting member 10 is to be inserted. Further, a diameter of the cylindrical inside space 20h as the basic shape is referred to as a space diameter 20hD. An annular C face 20c is formed by chamfering an entire border between the upper face 20r and the inside face 20f of the annular member 20. The annular C face 20c may be in a range of, for example, 0.3 to 0.6 or may be 0.5 (mm). An annular protrusion 20p is provided on the inside face 20f on the lower face 20e side of the annular member 20. The annular protrusion 20p is provided on an entire periphery of the inside face 20f. The annular protrusion 20p is inclined with respect to the inside face 20f so that the diameter of a section in the orthogonal direction H decreases as it goes from the upper face 20r side toward the lower face 20e.

The joined member 30 is a member produced by fitting the fitting member 10 into the annular member 20 to join the respective members together as described above. In the present embodiment, the joined member 30 is formed in a circular thick plate as a whole. The joined member 30 is a member produced by joining the fitting member 10 with the annular member 20 by Ring Mash (trademark registered in Japan) joining method (hereinafter referred to as just "Ring Mash joining"). According to the Ring Mash joining, the fitting member 10 having a fitting diameter 10D slightly larger than the space diameter 20hD is fitted into the inside space 20h in the annular member 20 by supplying a pulse welding current under a pressure, so that the outside face 10s of the fitting member 10 is joined in solid phase (solid phase bonding) with an entire periphery of the inside face 20f of the annular member 20 completely or substantially equally. The solid phase joining method is used to join together the members to be joined with each other without fusion by keeping the members tightly contacted and heating them at a temperature lower than a melting point. The expression "slightly larger" in the above description that the fitting diameter 10D of the fitting member 10 is slightly larger than the space diameter 20hD of the inside space 20h of the annular member 20 (conversely speaking, the space diameter 20hD is slightly smaller than the fitting diameter 10D) means that it is a diameter suitable for Ring Mash joining. It may be in a range of 0.2 mm to 1.4 mm, for example (it may be 1.0 mm) or may be 1/500 to 1/50 the space diameter 20hD.

Figure 2:
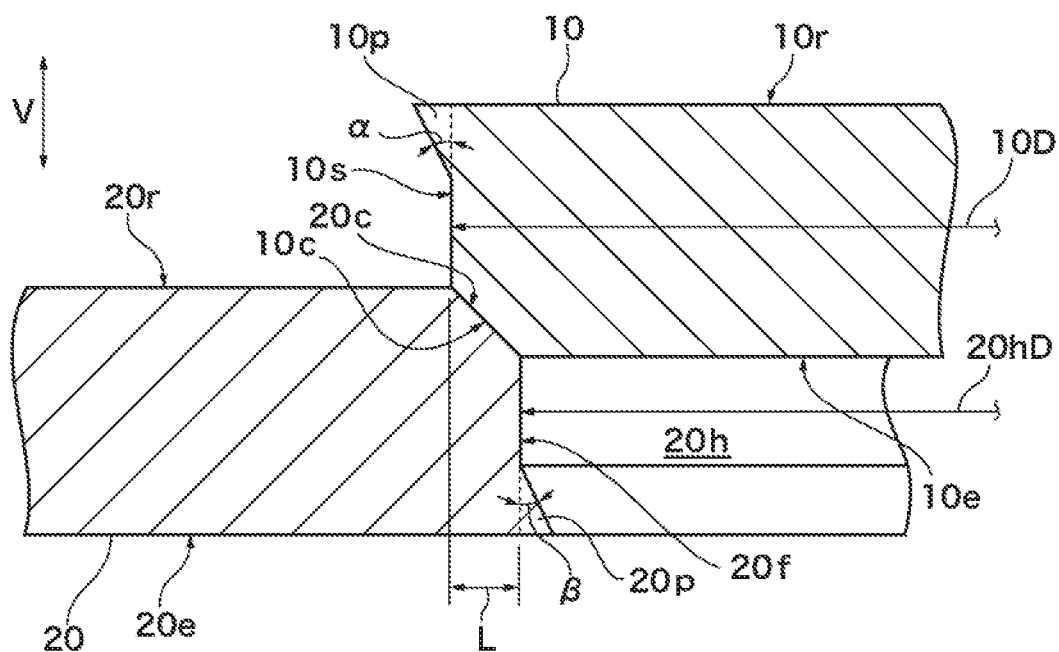
FIG. 2 is an enlarged partial sectional view, illustrating an area surrounding a contact portion between the fitting member and the annular member according to the present invention.

FIG. 2 is an enlarged partial sectional view of an area surrounding a contact portion between the fitting member 10 and the annular member 20 when fitting the fitting member 10 into the annular member 20. Because the fitting diameter 10D is formed slightly larger than the space diameter 20hD as described above, when fitting the fitting member 10 into the annular member 20, the fitting member 10 and the annular member 20 overlap each other partly so as to produce an overlapping margin L. When the fitting diameter 10D is larger than the space diameter 20hD by 0.2 mm to 1.4 mm, the overlapping margin L is 0.1 mm to 0.7 mm, and if larger by 1.0 mm, the overlapping margin L is 0.5 mm. Still with reference to FIG. 2, structures of surroundings of the fitting protrusion 10p of the fitting member 10 and the annular protrusion 20p of the annular member 20 will be additionally described. In the enlarged partial section shown in FIG. 2, as for the fitting protrusion 10p, an angle α defined as the angle between the outside face 10s assuming that there is no fitting protrusion 10p and an outside face of the fitting protrusion 10p is desired to be 14° to 20°. Although the outside face 10s and the fitting protrusion 10p are expressed separately for convenience for description, typically, the fitting protrusion 10p is formed integrally with the outside face 10s. The length of the outside face 10s extending in a thickness direction V between the fitting C face 10c and the fitting protrusion 10p (hereinafter it may be referred to as "fitting straight portion") may be about 1/3 the annular member thickness 20t. In the enlarged partial section shown in FIG. 2, as for the annular protrusion 20p, an angle β defined as the angle between the inside face 20f assuming that there is no annular protrusion 20p and an outside of the annular protrusion 20p is desired to be 14° to 20°. Although the inside face 20f and the annular protrusion 20p are expressed separately for convenience for description, typically, the annular protrusion 20p is formed integrally with the inside face 20f. The length of the inside face 20f extending in the thickness direction V between the annular C face 20c and the annular protrusion 20p (hereinafter it may be referred to as "annular straight portion") may be about 1/3 the annular member thickness 20t.

Figure 3:
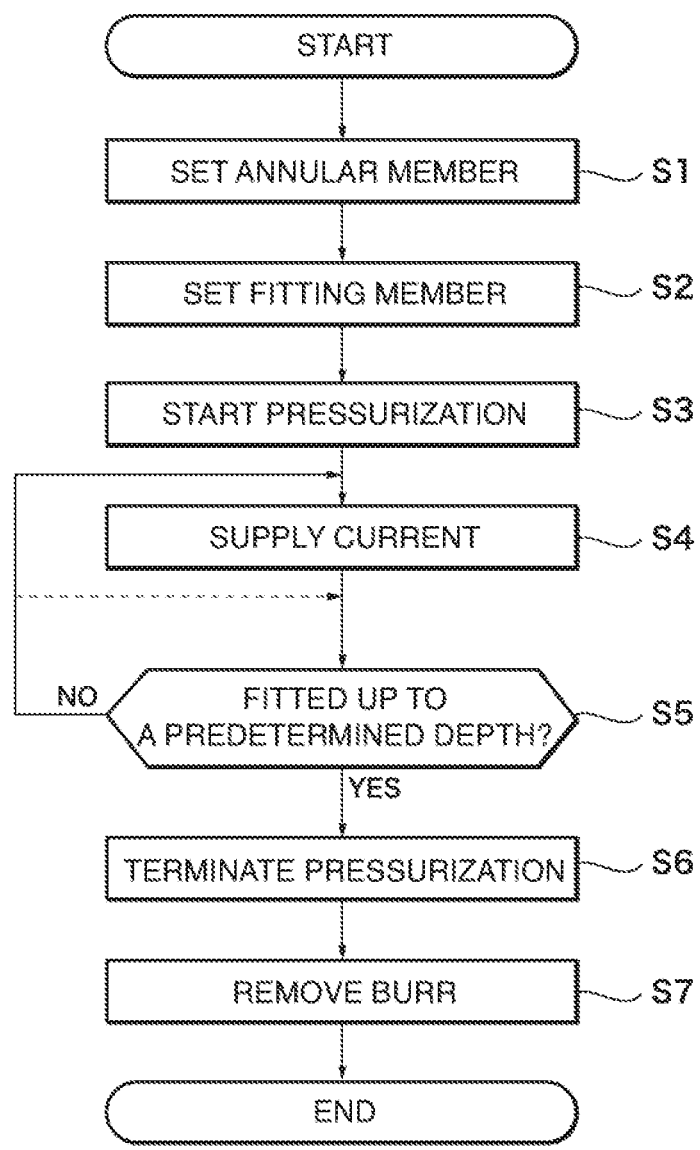
FIG. 3 is a flow chart, showing a procedure for manufacturing the joined member according to the present invention.
Figure 5A:
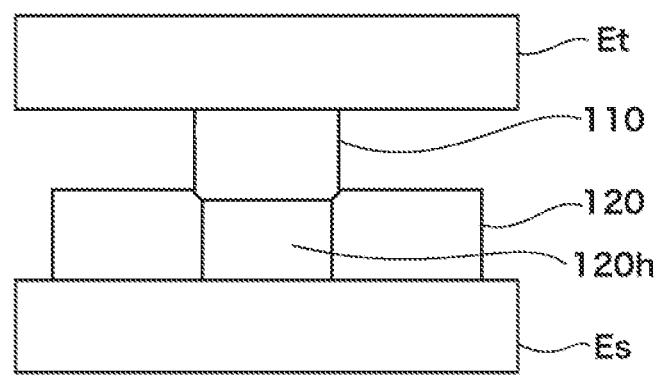
FIG. 5A is an end view, illustrating a joined member manufactured in a conventional manner.

Next, with reference to FIG. 3, a manufacturing method for the joined member 30 will be described. FIG. 3 is a flowchart indicating a procedure for manufacturing the joined member 30. When referring to the structures of the fitting member 10, the annular member 20 and the joined member 30 in a following description about the manufacturing method for the joined member 30, FIGS. 1 and 2 are used for reference as appropriate. Further, according to the present embodiment, when manufacturing the joined member 30, the conventionally used upper electrode Et (see FIG. 5A) and the lower electrode Es (see FIG. 5A) are used, and when referring to these electrodes, FIG. 5A is referred to as appropriate. In the meantime, the upper electrode Et and the lower electrode Es are arranged on an electric circuit although a related illustrative representation is omitted, and on this electric circuit, an AC power supply, a rectifier circuit, DC power supply circuit, capacitor, inverter circuit, transformer and the like are arranged also as appropriate.

When manufacturing of the joined member 30 is started, first, the annular member 20 is set on the lower electrode Es (S1). At this time, the lower face 20e of the annular member 20 is brought into a contact with the lower electrode Es. Next, the fitting member 10 is set above the inside space 20h in the annular member 20 such that the end face 10e is directed to the annular member 20 (S2). At this time, the fitting member 10 does not enter the inside space 20h because the fitting diameter 10D of the fitting member 10 is slightly larger than the space diameter 20hD. Typically, the fitting member 10 is placed on the annular member 20 such that the annular C face 20c of the annular member 20 keeps contact with the fitting C face 10c of the fitting member 10.

After the annular member 20 and the fitting member 10 are set, the upper electrode Et is placed on the top face 10r of the fitting member 10 and then pressurization by the fitting member 10 against the annular member 20 is started by moving the upper electrode Et and the lower electrode Es relative to each other such that they approach each other (S3). Under such a pressurization, a switch for an AC power supply (not shown) on the electric circuit which the upper electrode Et and the lower electrode Es are connected to is turned ON appropriately so as to supply a current between the upper electrode Et and the lower electrode Es through the fitting member 10 and the annular member 20 (current supplying step: S4). By supplying the current to the fitting member 10 and the annular member 20 under a pressure in a state in which they overlap each other slightly, a pressure and current are concentrated to a contact plane of both (fitting C face 10c and annular C face 20c). Consequently, an area in the vicinity of the contact portion of both is softened by Joule heat without fusion, so that diffusion of atoms occurs on the contact plane thereby achieving the joining. In this way, according to the present embodiment, the fitting member 10 and the annular member 20 are joined together in solid phase. In the meantime, typically, the supplying of a current is carried out by supplying one or a plurality of pulse currents continuously or intermittently depending on a situation.

When the fitting member 10 and the annular member 20 are supplied with the current appropriately under a pressure, whether the fitting member 10 has been fitted into the inside space 20h in the annular member 20 up to a predetermined depth is determined (S5). This determination may be carried out by a machine (sensor, control unit or the like) or an operator. The predetermined depth is a depth which is required when the joined member 30 becomes a product. The Ring Mash joining of the present embodiment provides an advantage that a deep joining in an axial direction (thickness direction V) is allowed so that coaxial accuracy can be obtained more easily as compared to, for example, ring projection joining. Unless the fitting member 10 has been fitted into the inside space 20h up to the predetermined depth, the procedure returns to current supplying step (S4). In the meantime, although FIG. 3 indicates that the procedure returns to current supplying step (S4), if the supplying of a current is not necessary, the procedure may return to the step of determining whether the fitting member 10 has been fitted into the inside space 20h up to the predetermined depth (S5) (indicated by dotted line in FIG. 3).

Figure 5B:
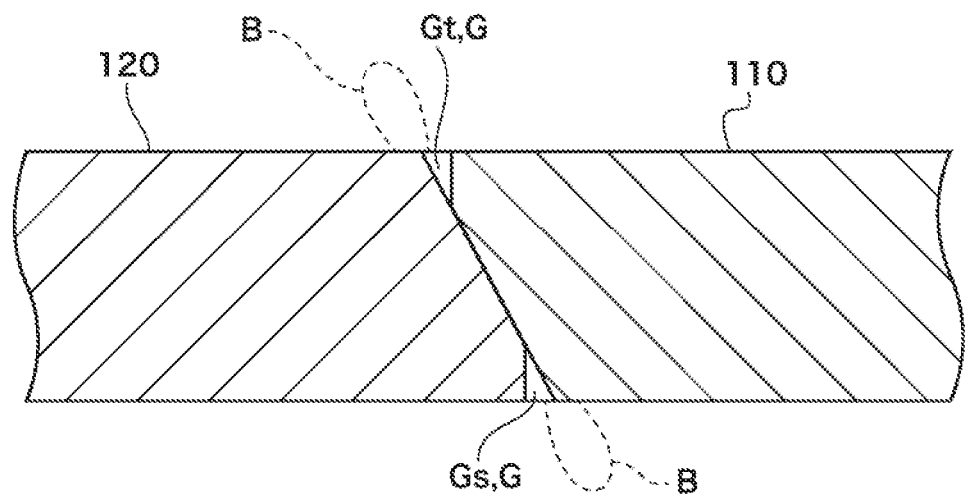
FIG. 5B is an enlarged partial sectional view of the conventional joined member.

In the step of fitting the fitting member 10 into the inside space 20h in the annular member 20 up to the predetermined depth, a conventional method has a fear that a surface not-joined portion Gt (see FIG. 5B) may be produced near a place where the upper face 20r of the annular member 20 comes near to the fitting member 10 while an end not-joined portion Gs (see FIG. 5B) may be produced near a place where the end face 10e of the fitting member 10 comes near to the annular member 20 as the fitting depth increases. However, because according to the present embodiment, the fitting member 10 is provided with the fitting protrusion 10p and the annular member 20 is provided with the annular protrusion 20p, when the fitting member 10 is fitted into the inside space 20h up to the predetermined depth, a portion which could turn to the surface not-joined portion Gt (see FIG. 5B) is filled with the fitting protrusion 10p and a portion which could turn to the end not-joined portion Gs (see FIG. 5B) is filled with the annular protrusion 20p. Thus, the joined member 30 produced according to the manufacturing method of the present embodiment has no not-joined portion G (see FIG. 5B). In views of such technical significance, the fitting protrusion 10p is formed in a size and shape which fill the surface not-joined portion Gt (see FIG. 5B) which can be produced in the conventional method (in a case where no fitting protrusion 10p is provided), and the annular protrusion 20p is formed in a size and shape which fill the end not-joined portion Gs (see FIG. 5B) which could be produced in the conventional method.

In the case where the conventional rod-like member 110 (see FIG. 5A) is fitted into the annular member 120 (see FIG. 5A), the not-joined portion G (see FIG. 5B) is generated as the large fitting depth is required. Thus, in order to eliminate the not-joined portion G (see FIG. 5B), the annular member 120 (see FIG. 5A) formed with a larger thickness than required was joined and in a subsequent step, a portion corresponding to the not-joined portion G (see FIG. 5B) was machined off to adjust the thickness. With this regard, according to the present embodiment, when the fitting member 10 is fitted into the inside space 20h in the annular member 20 at the predetermined depth, no not-joined portion G (see FIG. 5B) is generated. Consequently, the annular member thickness 20t of the annular member 20 before joining can be determined to be a thickness of the joined member 30 as a product. Further, not only the conventional subsequent cutting on machining step may be eliminated with only removal of burr but also any excessive material including a portion to be cut off does not have to be used.

In the step of determining whether the fitting member 10 has been inserted into the inside space 20h up to the predetermined depth (S5), if the fitting member has been fitted up to the predetermined depth, moving the upper electrode Et and the lower electrode Es relatively so that they approach each other is stopped and then, the pressurization by the fitting member 10 against the annular member 20 is terminated (S6). In the meantime, from the step of starting the pressurization by the fitting member 10 against the annular member 20 (S3) to the step of terminating the pressurization by the fitting member 10 against the annular member 20 (S6) corresponds to a pressurization step. By fitting the fitting member 10 into the inside space 20h up to the predetermined depth, the joined member 30 is produced. Before the fitting member 10 is fitted into the annular member 20, a side face of the fitting member 10 has a continuous zigzag line contour including the fitting C face 10c, the fitting straight portion and the fitting protrusion 10p, and an inside face on the border between the annular member 20 and the inside space 20h has a continuous zigzag line contour including the annular C face 20c, the annular straight portion and annular protrusion 20p. However, in the joined member 30, each of the zigzag line contours becomes substantially linear due to the joining in solid phase. After the pressurization by the fitting member 10 against the annular member 20 terminates (S6), the joined member 30 is picked up by retracting the upper electrode Et. At this time, an excessive material corresponding to the overlapping margin L appears as burrs B on both surfaces of the joined member 30. Then, the burrs B are removed (S7). When the burrs B are removed (S7), the joined member 30 is completed.

According to the present embodiment, as described above, the joined member 30 is manufactured by fitting the fitting member 10 with the fitting protrusion 10p into the annular member 20 with the annular protrusion 20p. Consequently, the joined member 30 without a not-joined portion G (see FIG. 5B) can be obtained. Further, the conventional cutting or machining step is not required in a process of obtaining the joined member 30, thereby improving manufacturing efficiency further as compared to the conventional method.

Figure 4A:
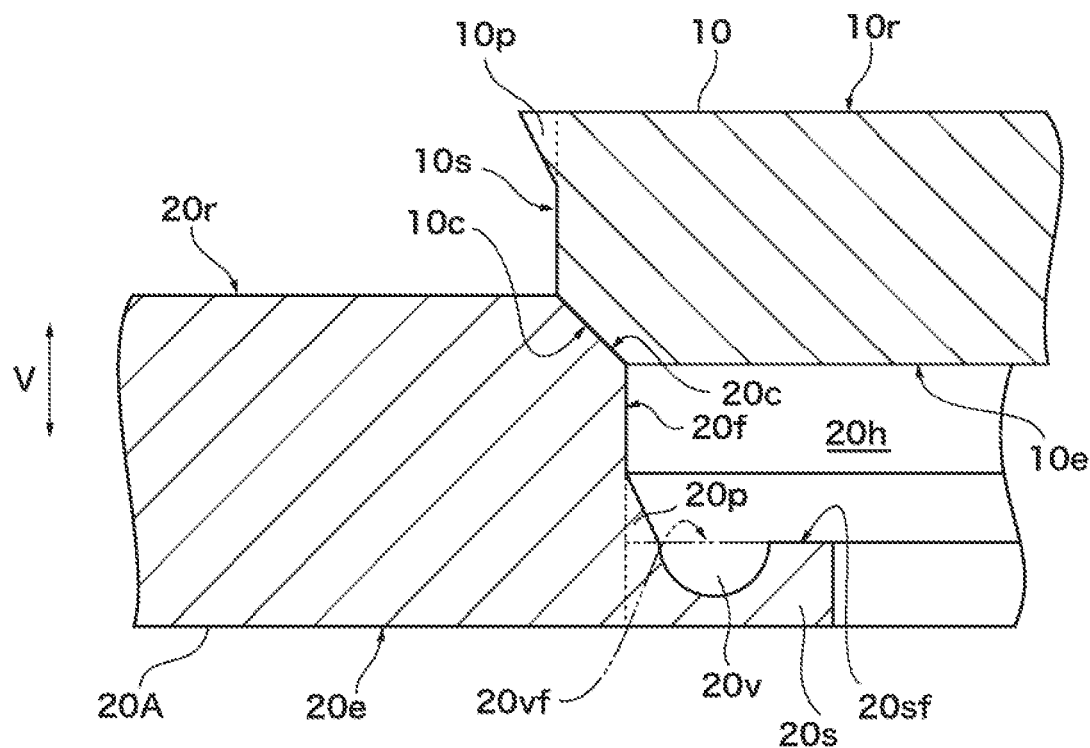
FIG. 4A is an enlarged partial sectional view, illustrating an area surrounding the annular member in a state before the fitting member and the annular member are fitted together according to a modification example of an embodiment of the present invention.
Figure 4B:
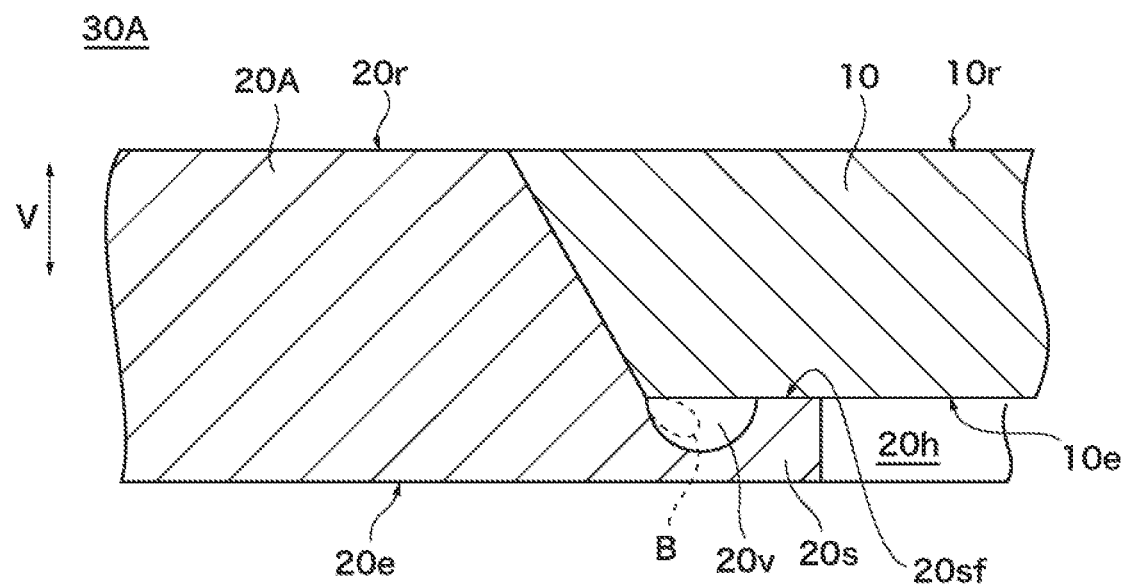
FIG. 4B is an enlarged partial sectional view, illustrating the area surrounding the annular member in a state of the joined member being completed by fitting the fitting member to the annular member according to the modification example of the embodiment of the present invention.

Next, with reference to FIGS. 4A and 4B, an annular member 20A according to a modification of the present invention will be described. Each of FIGS. 4A and 4B generally shows an enlarged partial sectional view of an area surrounding the annular member 20A, particularly, FIG. 4A is an enlarged partial sectional view, illustrating a state before the fitting member 10 and the annular member 20A are fitted to each other, and FIG. 4B is an enlarged partial sectional view, illustrating a state in which the fitting member 10 is fitted into the annular member 20A. As compared to the annular member 20 (see FIGS. 1A to 1C and 2), the annular member 20A contains an end receiver 20s, as an end portion receiver, which is projected inward of the inside space 20h from a portion near a lower face 20e of the inside face 20f. Thus, in the annular member 20A, the lower face 20e extends inward of the inside space 20h in comparison with the annular member 20 (see FIGS. 1A to 1C). The end receiver 20s blocks the fitting member 10, which has moved in the thickness direction V and entered the inside space 20h so that the end face 10e does not reach the same plane as the lower face 20e of the annular member 20A, staying within the inside space 20h on a side of the upper face 20r. The end receiver 20s has an end receiver face 20sf which the end face 10e of the fitting member 10 makes a contact with on its side facing the upper face 20r. In the annular member 20A, the annular protrusion 20p extends toward the upper face 20r not from the lower face 20e but from a virtual receiver face 20vf which spreads on the same plane as the end receiver face 20sf with a width thereof decreasing. In the annular member 20A, further, a pocket 20v recessed in a direction toward the lower face 20e is formed in a part of the end receiver 20s between the annular protrusion 20p and the end receiver face 20sf. The pocket 20v is a bag-like small space recessed from the virtual receiver face 20vf toward the lower face 20e. In the present embodiment, as shown in FIG. 4B, the pocket 20v is formed to turn to a closed space surrounded by the end face 10e of the fitting member 10 and the end receiver 20s when the end face 10e of the fitting member 10 makes a contact with the end receiver face 20sf of the annular member 20A. Other structure than the above description about the annular member 20A is the same as the annular member 20 (see FIGS. 1A to 1C).

In the case of the annular member 20A having the above-described structure, the fitting member 10 and the annular member 20A are sandwiched with the upper electrode Et and the lower electrode Es and supplied with a current appropriately under a pressure, in the same way as manufacturing the joined member 30 (see FIGS. 1B and 1C). As entry of the fitting member 10 into the inside space 20h is advanced a contact portion between the both is softened, so that the end face 10e of the fitting member 10 approaches the end receiver 20s of the annular member 20A. Then, when the end face 10e arrives at the end receiver face 20sf, the fitting member 10 cannot move further toward the side of the lower face 20e. As a result, a position of the end face 10e in the thickness direction V is determined at the position of the end receiver face 20sf. Consequently, when the annular member 20A is used, the end receiver face 20sf takes a role of a stopper so that accuracy in press-fitting depth of the fitting member 10 against the inside space 20h can be obtained. Further, the joined member 30A produced by fitting the fitting member 10 into the annular member 20A has an advantage that a load applied to a joined portion between the outside face 10s and the inside face 20f decreases when a force in the thickness direction V is applied to the fitting member 10, due to a provision of the end receiver face 20sf. Further, in manufacturing the joined member 30A using the annular member 20A, the burr B generated on the end face 10e side by Ring Mash joining is accommodated in the pocket 20v, thereby eliminating a time and labor for removing the burr B.

Although in the above description, the fitting member 10 is formed as a basic shape in a solid round bar, it may be hollow and/or the shape of a section in the orthogonal direction H may be other shape than a circle, for example, quadrangle, pentagon, hexagon or other polygon and may be an ellipse.

In the above description, the annular member 20 is formed in a donut shape which contains a cylindrical hole as a basic shape (inside space 20h) in the center of a circular thick plate. However, the contour of the outside edge in the section along the orthogonal direction H may be other shape than a circle, for example, quadrangle, pentagon, hexagon or other polygon and may be an ellipse. Further, the contour of the inside space 20h in the section along the orthogonal direction H may be other shape than a circle, for example, quadrangle, pentagon, hexagon or other polygon and may be an ellipse. That is, as far as the annular member 20 is formed in the fashion of an annularity (ring-like), the contour of the outside edge and/or the contour of the inside space 20h may be other shape than a circle.

In the above description, in manufacturing the joined member 30, the annular member 20 is set on the lower electrode Es, the fitting member 10 is set thereon and then the upper electrode Es is placed on the fitting member 10. However, it is permissible to replace the annular member 20 with the fitting member 10 and set the fitting member 10 on the lower electrode Es, set the annular member 20 thereon and place the upper electrode Et on the annular member 20. When the fitting member 10 is set on the lower electrode Es, the step of setting the fitting member 10 (S2) is executed prior to the step of setting the annular member 20 (S1) in the flowchart of FIG. 3. That is, the sequence of the step of setting the fitting member 10 (S2) and the step of setting the annular member 20 (S1) in the flowchart of FIG. 3 may be replaced as appropriate. Alternatively, the annular member 20 and the fitting member 10 may be set on the lower electrode Es at the same time with a state in which the fitting member 10 is placed on the annular member 20 or a state in which this up/down relationship is reversed.

In the above description, the fitting member, the annular member, the joined member and the manufacturing method for the joined member according to the embodiment of the present invention have been described as an example with the respective drawings. However, the configuration, the structure, the quantity, the arrangement, the shape and the material of each part are not restricted to the above-mentioned example, but such components which those skilled in the art apply selectively are included in the scope of the present invention as long as they incorporate philosophy of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS 10 fitting member
10D fitting diameter
10e end face
10p fitting protrusion
10s outside face
20, 20A annular member
20f inside face
20h inside space
20hD space diameter
20p annular protrusion
20r upper face
20s end receiver
20t annular member thickness
20v pocket
30, 30A joined member
Gs end not-joined portion
Gt surface not-joined portion
H orthogonal direction
V thickness direction

What is claimed is:

1. A joining system comprising an annular member of metallic material and a fitting member of metallic material to be fitted into an inside space of the annular member, the annular member having a predetermined thickness,
  wherein an axis of the fitting member is extended in a thickness direction when the fitting member is fitted into the inside space of the annular member, the thickness direction being a direction of the thickness of the annular member,
  wherein a contour of an inside face of the annular member is formed slightly smaller than a contour of an outside face of the fitting member in a section in an orthogonal direction, the inside face being a border of the annular member on the inside space, the orthogonal direction being a direction perpendicular to the thickness direction,
  wherein the fitting member is provided with a fitting protrusion on the outside face, wherein the fitting protrusion extends outward of the outside face and the fitting protrusion is for being applied into a surface not-joined portion when the fitting member is fitted into the inside space at a predetermined depth, and wherein the surface not-joined portion is a gap which would be between the fitting member and the annular member and would be produced adjacent to a surface of the annular member on a side in which the fitting member is to be inserted by fitting the fitting member into the inside space, if not for the fitting protrusion,
  wherein the annular member is provided with an annular protrusion on the inside face, wherein the annular protrusion extends toward the inside space from the inside face and the annular protrusion is for being applied into an end not-joined portion when the fitting member is fitted into the inside space at the predetermined depth, and wherein the end not-joined portion is a gap which would be between the fitting member and the annular member and would be produced adjacent to an end portion of the outside face of the fitting member existing in the inside space by fitting the fitting member into the inside space, if not for the annular protrusion,
  wherein the fitting member includes a top face and an opposing bottom face, such that the fitting member and the annular member are configured to be joined in a solid phase over an entire length of the outside face of the fitting member from the top face to the bottom face when the fitting member is fitted into the inside space,
  wherein the contour of the inside face of the annular member is between the annular protrusion and the surface not-joined portion, and
  wherein the contour of the outside face of the fitting member is between the fitting protrusion and the end not-joined portion.

2. The joining system of claim 1,
  wherein the annular member has an end portion receiver for receiving the end portion when the fitting member is fitted into the inside space at the predetermined depth, and
  wherein the end portion receiver is formed to produce a pocket between the end portion receiver and the end portion when the fitting member is fitted into the inside space at the predetermined depth.

3. The joining system of claim 1, wherein an angle between the outside face assuming that there is no fitting protrusion and an outside face of the fitting protrusion is in a range of 14 degrees to 20 degrees.

4. The joining system of claim 1, wherein an angle between the inside face assuming that there is no annular protrusion and an outside face of the annular protrusion is in a range of 14 degrees to 20 degrees.

5. A manufacturing method of a joined member, comprising:
- a step of providing the joining system of claim 1;
- a pressurization step of pressurizing the fitting member and the annular member until the fitting member is fitted into the inside space at the predetermined depth; and
- a current supplying step of supplying a current to a contact portion between the fitting member and the annular member during the pressurization step;
- wherein the fitting member and the annular member are joined in solid phase along the contact portion in the pressurization step and the current supplying step so as to produce the joined member.

\* \* \* \* \*